United States Patent
Deghel et al.

(10) Patent No.: US 11,601,920 B2
(45) Date of Patent: Mar. 7, 2023

(54) METHODS AND APPARATUSES FOR MULTIPLE TRANSMISSION AND RECEPTION POINT (MULTI-TRP) PHYSICAL UPLINK CONTROL CHANNEL (PUCCH) SCHEME DETERMINATION

(71) Applicant: NOKIA TECHNOLOGIES OY, Espoo (FI)

(72) Inventors: Matha Deghel, Paris (FR); Keeth Saliya Jayasinghe Laddu, Espoo (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 86 days.

(21) Appl. No.: 17/205,607

(22) Filed: Mar. 18, 2021

(65) Prior Publication Data

US 2022/0303966 A1 Sep. 22, 2022

(51) Int. Cl.
*H04W 72/04* (2009.01)

(52) U.S. Cl.
CPC .............................. *H04W 72/0406* (2013.01)

(58) Field of Classification Search
USPC ....... 370/229, 230, 236, 252, 328, 329, 330, 370/431, 436, 437, 458, 465, 468
See application file for complete search history.

(56) References Cited

U.S. PATENT DOCUMENTS

| | | | | |
|---|---|---|---|---|
| 2019/0068313 A1* | 2/2019 | Lyu | ....................... | H04L 1/0007 |
| 2020/0196351 A1* | 6/2020 | Zhou | ..................... | H04W 76/27 |
| 2020/0205150 A1* | 6/2020 | Cheng | ................ | H04W 72/0413 |
| 2021/0351837 A1* | 11/2021 | Nader | ................... | H04B 7/0693 |
| 2021/0360616 A1* | 11/2021 | Yi | ....................... | H04W 72/0413 |
| 2022/0094389 A1* | 3/2022 | Khoshnevisan | ....... | H04B 1/713 |
| 2022/0225379 A1* | 7/2022 | Khoshnevisan | ..... | H04B 7/0408 |

OTHER PUBLICATIONS

"RAN1 Chairman's Notes", 3GPP TSG RAN WG1 Meeting #102-e, Aug. 17, 2020.
"RAN1 Chairman's Notes", 3GPP TSG RAN WG1 Meeting #103-e, Oct. 26, 2020.
"3rd Generation Partnership Project; Technical Specification Group Radio Access Network; NR; Physical layer procedures for control (Release 16)", 3GPP TS 38.213, V16.4.0, Dec. 2020.
"3rd Generation Partnership Project; Technical Specification Group Radio Access Network; NR; Radio Resource Control (RRC) protocol specification (Release 16)", 3GPP TS 38.331, V16.3.1, Jan. 2021.
Samsung, "New WID: Further enhancements on MIMO for NR", 3GPP TSG RAN Meeting #86, RP-193133, Dec. 9, 2019.

* cited by examiner

*Primary Examiner* — Nguyen H Ngo
(74) *Attorney, Agent, or Firm* — Squire Patton Boggs (US) LLP (57) ABSTRACT

Systems, methods, apparatuses, and computer program products for multiple transmission-reception point (multi-TRP) physical uplink control channel (PUCCH) scheme determination are provided. One method may include receiving, at a user equipment, at least one of an indication or configuration comprising information relating to one or more multi-TRP PUCCH schemes. The method may also include determining a multi-TRP scheme to apply for an uplink control information (UCI) transmission using at least one of the indication or the configuration, and transmitting the UCI on PUCCH according to the determined multi-TRP PUCCH scheme.

20 Claims, 5 Drawing Sheets

METHODS AND APPARATUSES FOR MULTIPLE TRANSMISSION AND RECEPTION POINT (MULTI-TRP) PHYSICAL UPLINK CONTROL CHANNEL (PUCCH) SCHEME DETERMINATION

FIELD

Some example embodiments may generally relate to communications including mobile or wireless telecommunication systems, such as Long Term Evolution (LTE) or fifth generation (5G) radio access technology or new radio (NR) access technology, or other communications systems. For example, certain example embodiments may generally relate to systems and/or methods for multiple transmission-reception point (TRP) physical uplink control channel (PUCCH) scheme determination.

BACKGROUND

Examples of mobile or wireless telecommunication systems may include the Universal Mobile Telecommunications System (UNITS) Terrestrial Radio Access Network (UTRAN), Long Term Evolution (LTE) Evolved UTRAN (E-UTRAN), LTE-Advanced (LTE-A), MulteFire, LTE-A Pro, and/or fifth generation (5G) radio access technology or new radio (NR) access technology. 5G wireless systems refer to the next generation (NG) of radio systems and network architecture. A 5G system is mostly built on a 5G new radio (NR), but a 5G (or NG) network can also build on the E-UTRA radio. It is estimated that NR provides bitrates on the order of 10-20 Gbit/s or higher, and can support at least service categories such as enhanced mobile broadband (eMBB) and ultra-reliable low-latency-communication (URLLC) as well as massive machine type communication (mNITC). NR is expected to deliver extreme broadband and ultra-robust, low latency connectivity and massive networking to support the Internet of Things (IoT). With IoT and machine-to-machine (M2M) communication becoming more widespread, there will be a growing need for networks that meet the needs of lower power, low data rate, and long battery life. The next generation radio access network (NG-RAN) represents the RAN for 5G, which can provide both NR and LTE (and LTE-Advanced) radio accesses. It is noted that, in 5G, the nodes that can provide radio access functionality to a user equipment (i.e., similar to the Node B, NB, in UTRAN or the evolved NB, eNB, in LTE) may be named next-generation NB (gNB) when built on NR radio and may be named next-generation eNB (NG-eNB) when built on E-UTRA radio.

SUMMARY

An embodiment may be directed to a method, which may include receiving, at a user equipment, at least one of an indication or configuration comprising information relating to one or more multiple transmission reception point (multi-TRP) physical uplink control channel (PUCCH) schemes. The method may also include determining a multi-TRP scheme to apply for an uplink control information (UCI) transmission using at least one of the indication or the configuration, and transmitting the uplink control information (UCI) on physical uplink control channel (PUCCH) according to the determined multi-TRP physical uplink control channel (PUCCH) scheme.

An embodiment may be directed to an apparatus, which may include at least one processor and at least one memory comprising computer program code. The at least one memory and computer program code are configured, with the at least one processor, to cause the apparatus at least to receive at least one of an indication or configuration comprising information relating to one or more multiple transmission reception point (multi-TRP) physical uplink control channel (PUCCH) schemes, to determine a multi-TRP scheme to apply for an uplink control information (UCI) transmission using at least one of the indication or the configuration, and to transmit the uplink control information (UCI) on physical uplink control channel (PUCCH) according to the determined multi-TRP physical uplink control channel (PUCCH) scheme.

An embodiment may be directed to non-transitory computer readable medium comprising program instructions stored thereon for performing at least the following: receiving at least one of an indication or configuration comprising information relating to one or more multiple transmission reception point (multi-TRP) physical uplink control channel (PUCCH) schemes, determining a multi-TRP scheme to apply for an uplink control information (UCI) transmission using at least one of the indication or the configuration, and transmitting the uplink control information (UCI) on physical uplink control channel (PUCCH) according to the determined multi-TRP physical uplink control channel (PUCCH) scheme.

In a variant, the multi-TRP physical uplink control channel (PUCCH) schemes may comprise at least one of multi-TRP intra-slot PUCCH beam hopping, multi-TRP intra-slot PUCCH repetition, or multi-TRP inter-slot PUCCH repetition.

In a variant, the receiving may include receiving, from a network node, configuration information indicating an association of a physical uplink control channel (PUCCH) resource to a multi-TRP scheme, and receiving an indication to use the physical uplink control channel (PUCCH) resource for a multi-TRP PUCCH operation. The determining may include determining which of the one or more multi-TRP physical uplink control channel (PUCCH) schemes to apply based on the received configuration information and the indicated physical uplink control channel (PUCCH) resource.

In a variant, the receiving may include receiving configuration information indicating association of a physical uplink control channel (PUCCH) resource to a pair of multi-TRP physical uplink control channel (PUCCH) schemes, and receiving an indication to use the physical uplink control channel (PUCCH) resource for a multi-TRP physical uplink control channel (PUCCH) operation and/or receiving an indication of the number of physical uplink control channel (PUCCH) repetitions. The determining may include determining which multi-TRP physical uplink control channel (PUCCH) scheme to apply based on the received configuration information, the indicated physical uplink control channel (PUCCH) resource, and the indicated number of physical uplink control channel (PUCCH) repetitions.

In a variant, when the number of physical uplink control channel (PUCCH) repetitions is greater than one, and the physical uplink control channel (PUCCH) resource is associated to multi-TRP intra-slot physical uplink control channel (PUCCH) beam hopping scheme and multi-TRP intra-slot physical uplink control channel (PUCCH) repetition scheme, the determining may include determining to apply the multi-TRP intra-slot physical uplink control channel (PUCCH) repetition scheme. When the number of physical uplink control channel (PUCCH) repetitions is equal to one, the determining may include determining to apply the multi-TRP intra-slot physical uplink control channel (PUCCH) beam hopping scheme.

In a variant, the pair of multi-TRP physical uplink control channel (PUCCH) schemes may include at least one of: multi-TRP intra-slot physical uplink control channel (PUCCH) beam hopping and multi-TRP intra-slot physical uplink control channel (PUCCH) repetition, and/or multi-TRP intra-slot physical uplink control channel (PUCCH) beam hopping and multi-TRP inter-slot physical uplink control channel (PUCCH) repetition.

In a variant, the receiving may include receiving configuration information indicating that a downlink control information (DCI) format is configured with an indicator for multi-TRP physical uplink control channel (PUCCH) scheme pair, and receiving downlink control information (DCI) format containing an indication of the multi-TRP physical uplink control channel (PUCCH) scheme pair. The determining may include determining which of the one or more multi-TRP physical uplink control channel (PUCCH) schemes to apply based on at least one of the received indication or a configured or indicated number of physical uplink control channel (PUCCH) repetitions.

In a variant, when the number of physical uplink control channel (PUCCH) repetitions is equal to one, the determining may include determining to apply intra-slot beam hopping, or when the number of physical uplink control channel (PUCCH) repetitions is greater than one, and the pair multi-TRP intra-slot physical uplink control channel (PUCCH) beam hopping scheme and multi-TRP intra-slot physical uplink control channel (PUCCH) repetition scheme is indicated, the determining may include determining to apply multi-TRP intra-slot physical uplink control channel (PUCCH) repetition.

In a variant, the multi-TRP physical uplink control channel (PUCCH) scheme pair may include at least one of: at least one of multi-TRP intra-slot physical uplink control channel (PUCCH) beam hopping or multi-TRP intra-slot physical uplink control channel (PUCCH) repetition, and/or at least one of multi-TRP intra-slot physical uplink control channel (PUCCH) beam hopping or multi-TRP inter-slot physical uplink control channel (PUCCH) repetition.

In a variant, the receiving may include receiving configuration information indicating a default physical uplink control channel (PUCCH) scheme, the determining may include determining or receiving an indication to use a multi-TRP physical uplink control channel (PUCCH) scheme, and the method may further include determining that the indicated multi-TRP physical uplink control channel (PUCCH) scheme is not applicable or invalid and switching to using the default physical uplink control channel (PUCCH) scheme.

In a variant, the receiving may include receiving at least two physical uplink control channel (PUCCH) configurations, receiving indications via downlink control information (DCI) indicating one of the at least two physical uplink control channel (PUCCH) configurations and indicating a physical uplink control channel (PUCCH) resource, and determining the multi-TRP physical uplink control channel (PUCCH) scheme based on at least one of the received indication that indicated at least one of the physical uplink control channel (PUCCH) configuration, the received indication that indicated the physical uplink control channel (PUCCH) resource, or a corresponding number of physical uplink control channel (PUCCH) repetitions.

In a variant, at least one of the physical uplink control channel (PUCCH) configurations may contain physical uplink control channel (PUCCH) resources associated to at least one of multi-TRP intra-slot physical uplink control channel (PUCCH) repetition scheme or multi-TRP intra-slot physical uplink control channel (PUCCH) beam hopping scheme, and the other at least one of the physical uplink control channel (PUCCH) configurations may contain physical uplink control channel (PUCCH) resources associated to at least one of multi-TRP inter-slot physical uplink control channel (PUCCH) repetition scheme or multi-TRP intra-slot physical uplink control channel (PUCCH) beam hopping scheme.

In a variant, when the downlink control information (DCI) does not include an indication of one of the two physical uplink control channel (PUCCH) configurations, the method may include using a default physical uplink control channel (PUCCH) configuration.

In a variant, when two physical uplink control channel (PUCCH) configurations are configured and/or received, and both are within the same physical layer (PHY) priority, the method may include interpreting the physical layer (PHY) indicator as the multi-TRP physical uplink control channel (PUCCH) scheme indication. When two physical uplink control channel (PUCCH) configurations are configured and/or received and have different physical layer (PHY) priority, the method may include applying legacy behavior for interpreting the physical layer (PHY) priority indicator. When three physical uplink control channel (PUCCH) configurations are configured and/or received and have different physical layer (PHY) priority: for two physical uplink control channel (PUCCH) configurations with high priority, the method may include selecting which configuration to use considering high-priority configurations; for two physical uplink control channel (PUCCH) configurations with low priority, the method may include selecting one of (i) the high-priority configuration or (ii) one low-priority configuration, wherein within the low priority configurations using a pre-defined default configuration; for two physical uplink control channel (PUCCH) configurations with high priority, the method may include selecting one of (i) the low-priority configuration and (ii) one high-priority configuration, wherein within the high-priority configurations using a pre-defined default configuration. When four physical uplink control channel (PUCCH) configurations are configured and/or received and have different physical layer (PHY) priority, the method may include selecting which of the configurations to use considering high-priority configurations, or selecting high-priority configurations or low priority configurations.

BRIEF DESCRIPTION OF THE DRAWINGS

For proper understanding of example embodiments, reference should be made to the accompanying drawings, wherein.

DETAILED DESCRIPTION

It will be readily understood that the components of certain example embodiments, as generally described and illustrated in the figures herein, may be arranged and designed in a wide variety of different configurations. Thus, the following detailed description of some example embodiments of systems, methods, apparatuses, and computer program products for multiple transmission-reception point (TRP) physical uplink control channel (PUCCH) scheme determination, is not intended to limit the scope of certain embodiments but is representative of selected example embodiments.

The features, structures, or characteristics of example embodiments described throughout this specification may be combined in any suitable manner in one or more example embodiments. For example, the usage of the phrases "certain embodiments," "some embodiments," or other similar language, throughout this specification refers to the fact that a particular feature, structure, or characteristic described in connection with an embodiment may be included in at least one embodiment. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more example embodiments.

Additionally, if desired, the different functions or procedures discussed below may be performed in a different order and/or concurrently with each other. Furthermore, if desired, one or more of the described functions or procedures may be optional or may be combined. As such, the following description should be considered as illustrative of the principles and teachings of certain example embodiments, and not in limitation thereof.

A PUCCH configuration, which may be denoted as PUCCH-config, refers to a list and/or set of parameters that constitute or that are related to an uplink control information (UCI) resource or transmission. The parameters configured as part of a PUCCH configuration are provided and explained in, e.g., 3GPP technical specification (TS) 38.331 and TS 38.213. It is noted that a UCI may refer to at least one of a hybrid automatic repeat request acknowledgment (HARQ-ACK), a scheduling request (SR)/link recovery request (LRR)/beam-failure recovery request, and/or channel state information (CSI).

3GPP Release-15 NR defined the PUCCH repetition operation on multiple slots for PUCCH formats 1, 3 and 4, where an objective of PUCCH repetition is to increase reliability and coverage for the transmitted UCI. For each of these formats, the repetition operation, if enabled, includes repeating the PUCCH carrying UCI over multiple (consecutive) slots.

The PUCCH resource determination may depend on at least one of: PUCCH resource indicator (PRI) in downlink control information (DCI), UCI payload size, first control channel element (CCE) index of the physical downlink control channel (PDCCH) carrying the DCI, the total number of CCEs in the control resource set (CORESET) on which the PDCCH carrying the DCI has been transmitted, and/or UCI configuration, such as SR configuration, CSI configuration, or semi-persistent scheduling (SPS) HARQ-ACK configuration. The detailed procedure for PUCCH resource determination can be found, e.g., in 3GPP TS 38.213, section 9.

For efficient support of intra-UE multiplexing/prioritization, in 3GPP Release-16, two-levels of PHY priority (i.e. high-priority level 1/low-priority level 0) were introduced for UL data channels, as well as UL control channels. In Release-16, only prioritization is supported between channels of different priorities, i.e., multiplexing between channels associated with different priorities is not supported. More details on the PHY priority can be found, e.g., in 3GPP TS 38.213 section 9.

3GPP Release-17 includes consideration of enhancements on the support for multi-TRP deployment. One of the objectives regarding the multi-TRP operation includes identifying and specifying features to improve reliability and robustness for channels other than physical downlink shared channel (PDSCH), such as PDCCH, physical uplink shared channel (PUSCH) and PUCCH, using multi-TRP and/or multi-panel, with Release-16 reliability features as the baseline.

With respect to the support for multi-TRP PUCCH transmission or repetition schemes, it has been agreed to support time division multiplexed PUCCH scheme(s) to improve reliability and robustness for PUCCH using multi-TRP and/or multi-panel. For example, consideration is being given to an alternative supporting both inter-slot repetition and intra-slot repetition/intra-slot beam hopping, and an alternative supporting only inter-slot repetition. In inter-slot repetition, one PUCCH resource carries UCI, and another one or more PUCCH resources or the same PUCCH resource in another one or more slots carries a repetition of the UCI. In intra-slot repetition, one PUCCH resource carries UCI, and another one or more PUCCH resources or the same PUCCH resource in another one or more sub-slots carries a repetition of the UCI. In intra-slot beam hopping, UCI is transmitted in one PUCCH resource in which different sets of symbols have different beams. It is noted that this does not preclude consideration of the use of multiple PUCCH resources to repeat the same UCI in both inter-slot repetition and intra-slot repetition.

Based on the above, a multi-TRP PUCCH scheme could be any of the following: multi-TRP PUCCH inter-slot repetition (referred to as scheme 1), multi-TRP PUCCH intra-slot repetition (referred to as scheme 3), and multi-TRP PUCCH intra-slot beam hopping (referred to as scheme 2). It is expected that each of the multi-TRP PUCCH schemes may have its own frequency hopping related configuration. Thus, when a multi-TRP PUCCH scheme is applied, the corresponding frequency hopping configuration is applicable.

For multi-TRP TDM-ed PUCCH transmission schemes, it has been agreed to support the use of a single PUCCH resource and up to two spatial relation information can be activated per PUCCH resource via medium access control (MAC) control element (CE). For PUCCH multi-TRP enhancements in frequency range 1 (FR1), it has been agreed to support separate power control for different TRPs.

As can be seen from the above, the support of a single PUCCH resource has been agreed so far. This implies that a single PUCCH resource will be used for the different (TDM-ed) repetitions towards different TRPs. And up to two spatial relation information can be indicated and/or activated for a PUCCH resource via MAC CE, at least in frequency range 2 (FR2). And up to two sets of power control parameters can be indicated and/or activated for a PUCCH resource (e.g., via MAC CE), at least in FR1. It should be noted that a spatial relation information may also refer to an uplink (UL) beam, UL transmission configuration indicator (TCI) state, joint/common TCI state, spatial filter, etc.

As explained in the foregoing, while multi-TRP PUCCH transmission and repetition schemes are expected to be specified in 3GPP Release-17 NR, there remain some open issues related to the support of multi-TRP scheme switching or determination. For instance, an important aspect not yet resolved is how to enable the UE determining which multi-TRP PUCCH scheme should be used for a given UCI transmission. In other words, it remains to be defined how the UE would know which scheme to apply among: multi-TRP PUCCH inter-slot repetition (i.e., scheme 1), multi-TRP PUCCH intra-slot repetition (i.e., scheme 3), or multi-TRP PUCCH intra-slot beam hopping (i.e., scheme 2). Obviously, having one multi-TRP scheme configured at a time is not preferable, and it is desirable for the network to be able to somehow dynamically switch between the different multi-TRP schemes mainly to accommodate, e.g., different latency and/or reliability requirements.

Based in part on the issues discussed above, certain example embodiments can address at least the problem of how to enable switching between the different multi-TRP PUCCH schemes. In other words, some example embodiments are configured to enable the UE to determine which multi-TRP PUCCH scheme to apply at a given instance.

According to certain example embodiments, a multi-TRP PUCCH scheme may be determined at the UE using a specific indication and configuration. For example, a multi-TRP PUCCH scheme may include one or more of: multi-TRP intra-slot PUCCH beam hopping, multi-TRP intra-slot PUCCH repetition, or multi-TRP inter-slot PUCCH repetition.

Figure 1:
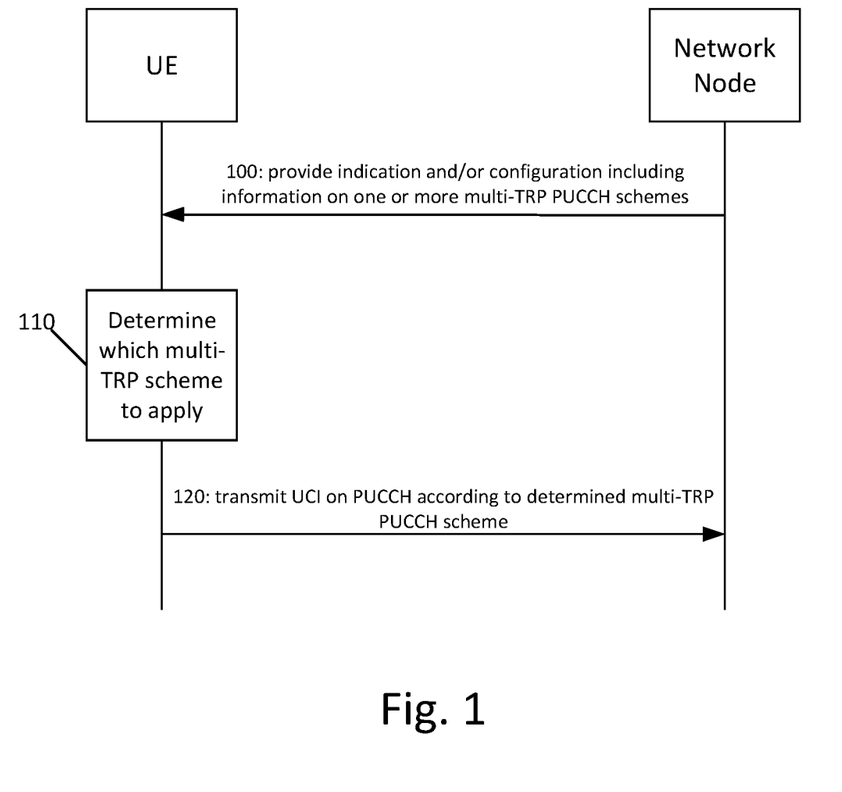
FIG. 1 illustrates an example signaling diagram, according to an embodiment.

FIG. 1 illustrates an example signaling diagram for determining a multi-TRP scheme to apply, according to one embodiment. As illustrated in the example of FIG. 1, the signaling may occur between a UE and network node, such as a base station, access node, node B, eNB, gNB, NG-RAN node, transmission-reception point(s) (TRP(s)), high altitude platform stations (HAPS), relay station, sidelink (SL) UE, or the like. In the example of FIG. 1, at 100, the network node may transmit or otherwise provide, to the UE, an indication and/or configuration that may include information relating to one or more multi-TRP PUCCH scheme(s). For example, the indication or configuration may be received according to any of the alternatives discussed below.

As further illustrated in the example of FIG. 1, at 110, the UE may determine a multi-TRP scheme to apply for a given UCI transmitting using the received indication and/or configuration. Then, at 120, the UE may transmit UCI on PUCCH according to the determined multi-TRP PUCCH scheme.

Example embodiments may include several alternatives that may be used individually or in combination to provide the specific indication and/or configuration that can be used to determine which multi-TRP PUCCH scheme to apply at a given instance, as will be discussed in detail below.

According to a first alternative, a PUCCH resource may be configured to be associated with a multi-TRP PUCCH scheme. Hence, when the UE is indicated this PUCCH resource (e.g., using PRI) or when the UE determines this PUCCH resource, the UE then knows which multi-TRP PUCCH scheme to use.

According to a second alternative, a PUCCH resource may be configured to be associated with a pair of multi-TRP PUCCH schemes, where the pair can be multi-TRP intra-slot PUCCH beam hopping and multi-TRP intra-slot PUCCH repetition, or multi-TRP intra-slot PUCCH beam hopping and multi-TRP inter-slot PUCCH repetition. The UE may then determine which multi-TRP PUCCH scheme to apply based on the indicated pair of schemes and(/or) the number of PUCCH repetitions. For example, if the UE is indicated the number of PUCCH repetitions in DCI and this number is greater than one, and the UE is indicated a PUCCH resource or when the UE determines this PUCCH resource, and this PUCCH resource is associated to multi-TRP intra-slot PUCCH beam hopping scheme and multi-TRP intra-slot PUCCH repetition scheme, the UE may then apply the multi-TRP intra-slot PUCCH repetition scheme. Otherwise, if the number of PUCCH repetitions is equal to one, UE applies multi-TRP intra-slot PUCCH beam hopping scheme. As another example, if the UE is indicated the number of PUCCH repetitions in DCI and this number is greater than one, and the UE is indicated a PUCCH resource or when the UE determines this PUCCH resource, and this PUCCH resource is associated to multi-TRP intra-slot PUCCH beam hopping scheme and multi-TRP inter-slot PUCCH repetition scheme, the UE may then apply the multi-TRP inter-slot PUCCH repetition scheme. Otherwise, if the number of PUCCH repetitions is equal to one, UE applies multi-TRP intra-slot beam hopping scheme.

According a third alternative, a UE may be indicated the multi-TRP PUCCH scheme via explicit field in DCI or MAC CE. For instance, one bit in DCI may be used to select a pair of multi-TRP PUCCH schemes, i.e., multi-TRP intra-slot PUCCH beam hopping and multi-TRP intra-slot PUCCH repetition or multi-TRP intra-slot PUCCH beam hopping and multi-TRP inter-slot PUCCH repetition. Then, the UE may determine which scheme to apply (from the indicated pair) based on the indicated or configured number of PUCCH repetitions. Specifically, if the number of PUCCH repetitions is equal to one, then the UE may apply multi-TRP intra-slot PUCCH beam hopping. Otherwise, for example if the number of PUCCH repetitions is greater than one, and the pair of schemes multi-TRP intra-slot PUCCH beam hopping and multi-TRP intra-slot PUCCH repetition is indicated, then the UE may apply multi-TRP intra-slot PUCCH repetition. On the other hand, if the number of PUCCH repetitions is greater than one, and the pair of schemes of multi-TRP intra-slot PUCCH beam hopping and multi-TRP inter-slot PUCCH repetition is indicated, then the UE may apply multi-TRP inter-slot PUCCH repetition.

It is noted that, in both the second alternative and the third alternative, the associated pair of multi-TRP PUCCH schemes cannot be intra-slot repetition and inter-slot repetition. If the intra-slot beam hopping is not supported as a PUCCH scheme or by the UE due to the UE capability, the pair mentioned before becomes a single scheme. It is noted that in both the second alternative and the third alternative a pair may, in some cases, be comprised of a single PUCCH scheme (e.g., only intra-slot beam hopping scheme), and when the UE determines to apply this scheme (e.g., based on indication in DCI) the indicated or configured number of PUCCH repetitions for the indicated/configured PUCCH resource may be overridden by a default number of PUCCH repetitions; for instance, if the UE is indicated to use intra-slot beam hopping scheme, but the number of PUCCH repetitions is greater than one, the UE may override this number and use number one (and thus a single PUCCH transmission/repetition) instead.

According to a fourth alternative, a UE may determine to apply a default PUCCH scheme different from the indicated multi-TRP PUCCH scheme if the latter one is not applicable/valid. For example, if the UE is indicated to use the multi-TRP intra-slot PUCCH beam hopping scheme or the multi-TRP intra-slot PUCCH repetition scheme, but due to switching gap(s) needed to switch uplink beam (i.e., spatial relation info or uplink TCI state) and/or to switch power control parameters, and/or due to DL symbols (where such symbols may be due to TDD configuration, e.g., in case of unpaired spectrum, and/or they may also refer to the symbols corresponding to SS/PBCH block or CSI-RS reception), the UE may determine that the indicated scheme is not applicable or valid, and the UE may then switch to using the multi-TRP inter-slot PUCCH repetition scheme. In a variant, if the UE is indicated to use a multi-TRP PUCCH scheme, but due to switching gap(s), needed to switch uplink beam (i.e., spatial relation info or uplink TCI state) and/or to switch power control parameters, and/or due to DL symbols, and/or due to other restrictions (allowed number of repetitions for single-TRP/multi-TRP mode, allowed PUCCH format for single-TRP/multi-TRP mode, any other fixed rules) on using the multi-TRP PUCCH scheme, the UE may determine that the indicated scheme is not applicable or valid, and the UE may then switch to using the corresponding single-TRP PUCCH scheme (or any other default mode/scheme defined by the specifications).

In some embodiments, the UE may determine that a certain scheme is not applicable/valid based on at least one of the following ways. The multi-TRP intra-slot PUCCH beam hopping scheme could be considered as not applicable/valid when the switching gap is greater than a given number of symbols. Alternatively, the multi-TRP intra-slot PUCCH beam hopping scheme could be considered as not applicable/valid when the number of symbols is muted/discarded (due to switching gap or DL symbols) from at least one of the two hops, and this number of symbols is greater than a configured threshold, including the case where, e.g., one of the hops is completely muted (i.e., this hop cannot be transmitted). The multi-TRP intra-slot PUCCH repetition scheme could be considered as not applicable/valid due to the switching gap(s) or DL symbols, for example when only one PUCCH repetition could be performed, e.g., within a slot. Alternatively, the multi-TRP intra-slot PUCCH repetition scheme could be considered as not applicable/valid due to the switching gap(s) or DL symbols when the number of PUCCH repetitions that could be performed, e.g., within a slot, is less than a configured threshold. In another variant, the multi-TRP PUCCH scheme may be restricted to apply in certain conditions (e.g., indicated number of PUCCH repetitions, used PUCCH format, any other rules), and if they are not fulfilled, the UE may follow single-TRP PUCCH repetition scheme (or any other default operation with single-TRP, or even any default multi-TRP PUCCH scheme).

According to a fifth alternative, at least two PUCCH configurations may be configured where one of the at least two PUCCH configurations is configured for at least one of multi-TRP PUCCH sub-slot repetition scheme and multi-TRP PUCCH intra-slot PUCCH beam hopping scheme and the other of the at least two PUCCH configurations is configured for at least one of multi-TRP inter-slot PUCCH repetition scheme and multi-TRP intra-slot PUCCH beam hopping scheme. Each PUCCH configuration may be configured with a different group (i.e., list) of PUCCH resources.

In an embodiment, an indicator may be used to point to one of the PUCCH configurations. This indicator may be included in DCI scheduling PUCCH or configured as part of the UCI configuration (such as SR configuration, SPS HARQ-ACK configuration, CSI configuration). After the UE knows which PUCCH configuration to use based on the indicator, the UE may determine the multi-TRP PUCCH scheme (i) based just on this configuration, if only one multi-TRP PUCCH scheme is configured in this configuration, or (ii) based on any one of the first to fourth alternatives, if two schemes are configured in this configuration. If the DCI does not contain the indicator, the UE could be configured to use a default PUCCH configuration; for example, PUCCH configuration with the lowest index (i.e. first PUCCH configuration).

If PHY priority (i.e., high/low) is configured together with the multi-TRP PUCCH schemes, there can be a maximum of two PUCCH configurations per priority. When an indicator is used to select one of the PUCCH configurations per given PHY priority, a similar behavior as discussed above may be applied per PHY priority. When PHY priority indicator is used as the indication of the PUCCH configuration, the cases discussed in the following may apply.

If just two PUCCH configurations are configured, and both are within the same PHY priority, the method of the fifth alternative may apply by interpreting PHY indicator as the multi-TRP PUCCH scheme indicator. If just two PUCCH configurations are configured and have different PHY priority, legacy behavior may apply for interpreting the PHY priority indicator.

If three PUCCH configurations are configured and have different PHY priority (two with one priority and third with different priority), there may be two PUCCH configurations with high priority or two PUCCH configurations with low priority. For two PUCCH configurations with high priority, an indicator field may select which one to use considering high-priority configurations, or the indicator field may select one of (i) the low-priority configuration and (ii) one high-priority configuration, where within the high-priority configurations the UE may use a pre-defined default configuration (and/or default PUCCH scheme). For two PUCCH configurations with low priority, an indicator field may select one of (i) the high-priority configuration and (ii) one low-priority configuration, where within the low priority configurations the UE may use a pre-defined default configuration (and/or default PUCCH scheme).

If four PUCCH configurations are configured and have different PHY priority (two with one priority and the other two with different priority), then an indicator field may select which one to use considering high-priority configurations, or the indicator field may select high-priority configurations or low priority configurations. A default configuration and/or a default PUCCH scheme may be defined per PHY priority.

In certain embodiments, for the first, second, fourth and fifth alternatives, multiple PUCCH resources could be associated to the same multi-TRP PUCCH scheme or to different schemes.

Figure 2:
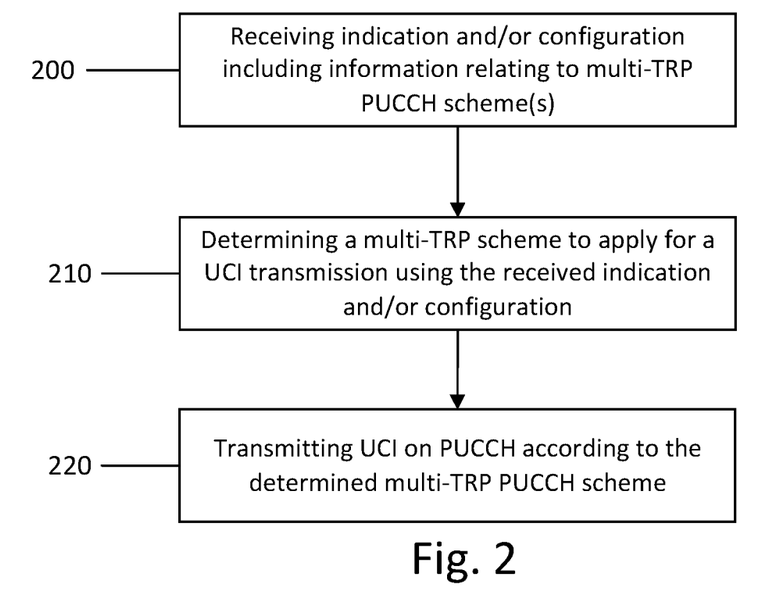
FIG. 2 illustrates an example flow diagram of a method, according to an embodiment.

FIG. 2 illustrates an example flow diagram of a method for determining a multi-TRP (PUCCH) scheme to apply, according to one example embodiment. In certain example embodiments, the flow diagram of FIG. 2 may be performed by a network entity or network node in a communications system, such as LTE or 5G NR. In some example embodiments, the network entity performing the method of FIG. 2 may include or be included in UE, communication node, mobile equipment (ME), mobile station, mobile device, stationary device, IoT device, or other device. As such, some of the operations illustrated in FIG. 2 may be similar to some operations shown in, and described with respect to, FIG. 1. Additionally, the examples illustrated in FIGS. 3-7, which are discussed below, provide several alternatives for performing one or more of the procedures depicted in FIG. 2.

As illustrated in the example of FIG. 2, the method may include, at 200, receiving from a network node an indication and/or configuration that may include information relating to one or more multi-TRP PUCCH scheme(s). For example, the indication or configuration may be received according to any of the alternatives illustrated in the examples of FIGS. 3-7 discussed below. The method may then include, at 210, determining a multi-TRP scheme to apply for a UCI transmission using the received indication and/or configuration. The examples of FIGS. 3-7, as discussed in detail below, provide some alternatives for how the determining 210 may be carried out. As further illustrated in the example of FIG. 2, the method may include, at 220, transmitting UCI on PUCCH according to the determined multi-TRP PUCCH scheme.

It is noted that, for a multi-TRP PUCCH scheme to be applicable, typically, two uplink beams, spatial relation information, and/or uplink TCI states should be indicated or activated. Specifically, for multi-TRP PUCCH operation, the configured or indicated PUCCH resource may typically have two spatial relation information or uplink TCI states indicated/activated. More generally, the UE would need to be able to determine two uplink beams in order for a multi-TRP PUCCH scheme to be applied. Alternatively, or additionally, the UE would need to be able to determine two sets of PUCCH power control parameters in order for a multi-TRP PUCCH scheme to be applied.

At least for multi-TRP intra-slot PUCCH repetition scheme, the UE would need to be configured (in the corresponding PUCCH configuration) at least the sub-slot length and thus the number of sub-slots per slot. For this same scheme, it may be possible that the multi-TRP PUCCH repetition operation is allowed to be across slots. In this case, the various PUCCH repetitions may be, e.g., in two (or more) consecutive slots.

Figure 3:
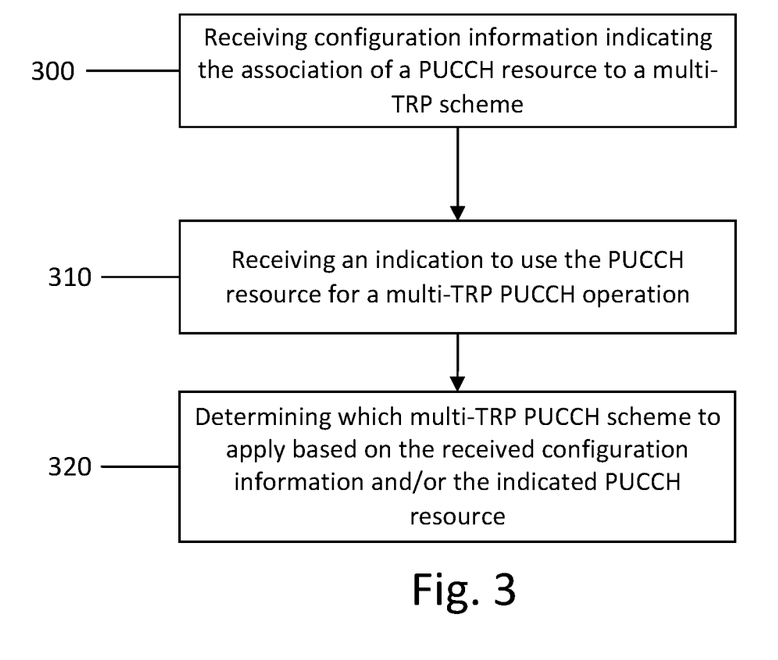
FIG. 3 illustrates an example flow diagram of a method, according to an embodiment.

FIG. 3 illustrates an example flow diagram of a method of a first alternative for determining a multi-TRP scheme to apply, according to an example embodiment. In certain example embodiments, the flow diagram of FIG. 3 may be performed by a network entity or network node in a communications system, such as LTE or 5G NR. In some example embodiments, the network entity performing the method of FIG. 3 may include or be included in UE, communication node, mobile equipment (ME), mobile station, mobile device, stationary device, IoT device, or other device. As such, some of the operations illustrated in FIG. 3 may be similar to some operations shown in, and described with respect to, FIG. 1.

As illustrated in the example of FIG. 3, the method may include, at 300, receiving, from a network node, configuration information indicating the association of a PUCCH resource to a multi-TRP scheme. As further illustrated in the example of FIG. 3, the method may include, at 310, receiving an indication to use the PUCCH resource for a multi-TRP PUCCH operation. The method may then include, at 320, determining which multi-TRP PUCCH scheme to apply based on the received configuration information and/or the indicated PUCCH resource. As a result of the example method of FIG. 3, when a UE is indicated the PUCCH resource (e.g., using PRI) or when the UE determines the PUCCH resource, the UE may then know which multi-TRP PUCCH scheme to use.

Figure 4:
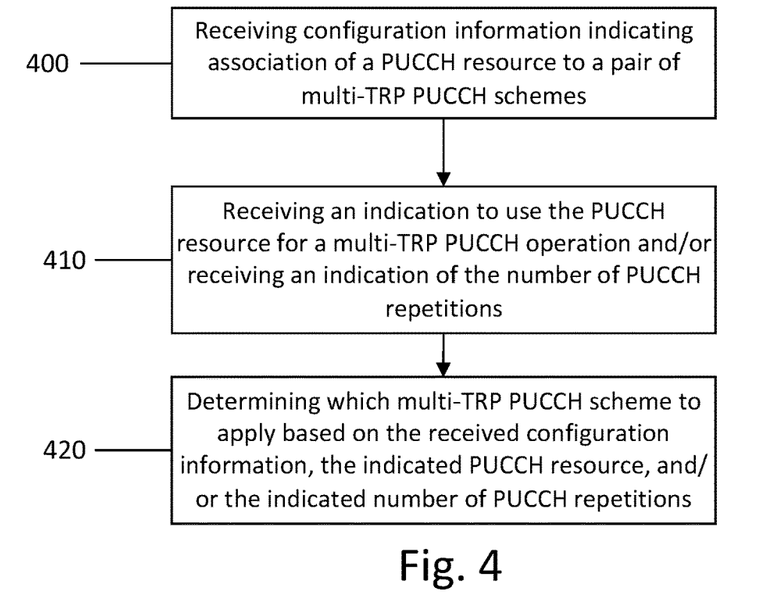
FIG. 4 illustrates an example flow diagram of a method, according to an embodiment.

FIG. 4 illustrates an example flow diagram of a method of a second alternative for determining a multi-TRP scheme to apply, according to an example embodiment. In certain example embodiments, the flow diagram of FIG. 4 may be performed by a network entity or network node in a communications system, such as LTE or 5G NR. In some example embodiments, the network entity performing the method of FIG. 4 may include or be included in UE, communication node, mobile equipment (ME), mobile station, mobile device, stationary device, IoT device, or other device. As such, some of the operations illustrated in FIG. 4 may be similar to some operations shown in, and described with respect to, FIG. 1.

As illustrated in the example of FIG. 4, the method may include, at 400, receiving configuration information indicating association of a PUCCH resource to a pair of multi-TRP PUCCH schemes. For example, the pair of multi-TRP PUCCH schemes may include: multi-TRP intra-slot PUCCH beam hopping and multi-TRP intra-slot PUCCH repetition, or multi-TRP intra-slot PUCCH beam hopping and multi-TRP inter-slot PUCCH repetition.

In an embodiment, the method of FIG. 4 may also include, at 410, receiving an indication to use the PUCCH resource for a multi-TRP PUCCH operation and/or receiving an indication of the number of PUCCH repetitions. According to some embodiments, the method of FIG. 4 may include, at 420, determining which multi-TRP PUCCH scheme to apply based on the received configuration information, the indicated PUCCH resource, and/or the indicated number of PUCCH repetitions. For example, the determining 420 may include, when the number of PUCCH repetitions is greater than one, and the PUCCH resource is associated to multi-TRP intra-slot PUCCH beam hopping scheme and multi-TRP intra-slot PUCCH repetition scheme (respectively, multi-TRP inter-slot PUCCH repetition scheme), determining to apply the multi-TRP intra-slot repetition scheme (resp., multi-TRP inter-slot PUCCH repetition scheme). Otherwise, the determining 420 may include, when the number of PUCCH repetitions is equal to one, determining to apply the multi-TRP intra-slot PUCCH beam hopping scheme.

Figure 5:
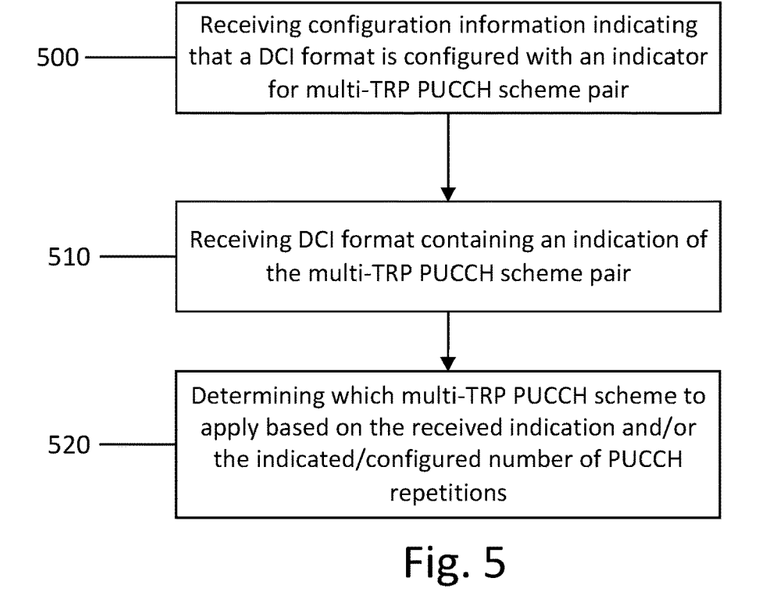
FIG. 5 illustrates an example flow diagram of a method, according to an embodiment.

FIG. 5 illustrates an example flow diagram of a method of a third alternative for determining a multi-TRP scheme to apply, according to an example embodiment. In certain example embodiments, the flow diagram of FIG. 5 may be performed by a network entity or network node in a communications system, such as LTE or 5G NR. In some example embodiments, the network entity performing the method of FIG. 5 may include or be included in UE, communication node, mobile equipment (ME), mobile station, mobile device, stationary device, IoT device, or other device. As such, some of the operations illustrated in FIG. 5 may be similar to some operations shown in, and described with respect to, FIG. 1.

As illustrated in the example of FIG. 5, the method may include, at 500, receiving configuration information indicating that a DCI format is configured with an indicator for multi-TRP PUCCH scheme pair. For instance, the multi-TRP PUCCH scheme pair may include one or more of multi-TRP intra-slot PUCCH beam hopping and/or multi-TRP intra-slot PUCCH repetition, or multi-TRP intra-slot PUCCH beam hopping and/or multi-TRP inter-slot PUCCH repetition. In an embodiment, the method of FIG. 5 may also include, at 510, receiving DCI format containing an indication of the multi-TRP PUCCH scheme pair. The method may then include, at 520, determining which multi-TRP PUCCH scheme to apply based at least on the received indication and/or the indicated/configured number of PUCCH repetitions. For example, the determining 520 may include, when the number of PUCCH repetitions is equal to one, determining to apply intra-slot beam hopping. Otherwise, when the number of PUCCH repetitions is greater than one, and the pair multi-TRP intra-slot PUCCH beam hopping scheme and multi-TRP intra-slot PUCCH repetition scheme (resp., multi-TRP inter-slot PUCCH repetition scheme) is indicated, the determining 520 may include determining to apply multi-TRP intra-slot PUCCH repetition (resp., multi-TRP inter-slot PUCCH repetition).

Figure 6:
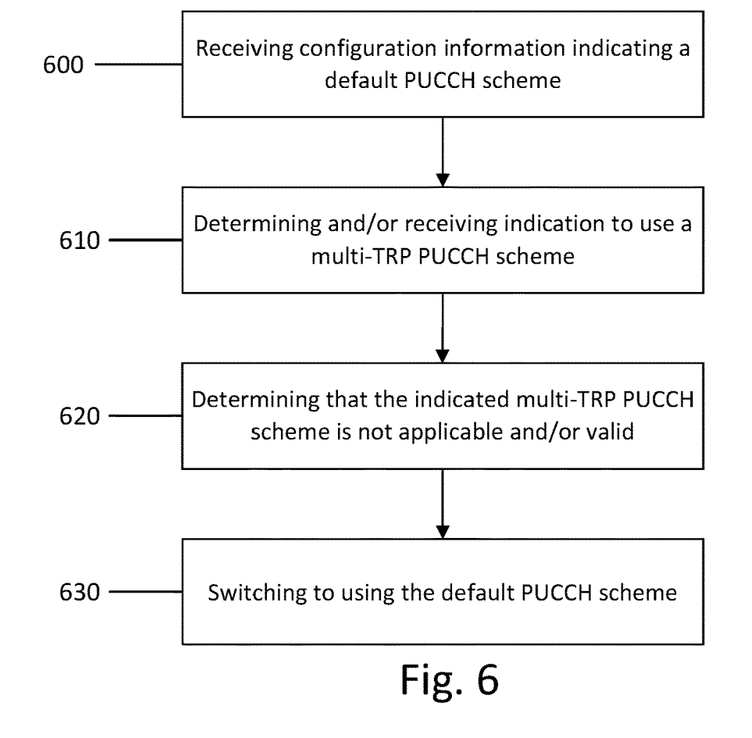
FIG. 6 illustrates an example flow diagram of a method, according to an embodiment.

FIG. 6 illustrates an example flow diagram of a method of a fourth alternative for determining a multi-TRP scheme to apply, according to an example embodiment. In certain example embodiments, the flow diagram of FIG. 6 may be performed by a network entity or network node in a communications system, such as LTE or 5G NR. In some example embodiments, the network entity performing the method of FIG. 6 may include or be included in UE, communication node, mobile equipment (ME), mobile station, mobile device, stationary device, IoT device, or other device. As such, some of the operations illustrated in FIG. 6 may be similar to some operations shown in, and described with respect to, FIG. 1.

As illustrated in the example of FIG. 6, the method may include, at 600, receiving configuration information indicating a default PUCCH scheme. In an embodiment, the method may include, at 610, determining and/or receiving indication to use a multi-TRP PUCCH scheme (e.g., the multi-TRP intra-slot PUCCH beam hopping scheme or the multi-TRP intra-slot PUCCH repetition scheme). The method also include, at 620, determining that the indicated multi-TRP PUCCH scheme is not applicable and/or valid, for example due to switching gaps, due to a need to switch uplink beam and/or to switch power control parameters, and/or due to DL symbols. In certain embodiments, responsive to the determining 620, the method of FIG. 6 may also include, at 630, switching to using the default PUCCH scheme (e.g., multi-TRP inter-slot PUCCH repetition scheme or single-TRP PUCCH scheme).

Figure 7:
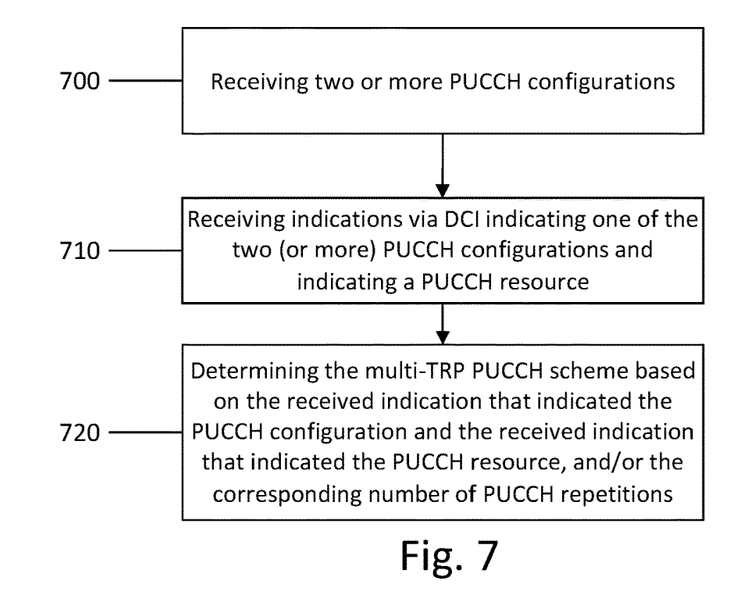
FIG. 7 illustrates an example flow diagram of a method, according to an embodiment.

FIG. 7 illustrates an example flow diagram of a method of a fifth alternative for determining a multi-TRP scheme to apply, according to an example embodiment. In certain example embodiments, the flow diagram of FIG. 7 may be performed by a network entity or network node in a communications system, such as LTE or 5G NR. In some example embodiments, the network entity performing the method of FIG. 7 may include or be included in UE, communication node, mobile equipment (ME), mobile station, mobile device, stationary device, IoT device, or other device. As such, some of the operations illustrated in FIG. 7 may be similar to some operations shown in, and described with respect to, FIG. 1.

As illustrated in the example of FIG. 7, the method may include, at 700, receiving two or more PUCCH configurations. In an embodiment, one of the received PUCCH configurations contains PUCCH resources associated to multi-TRP PUCCH sub-slot repetition scheme and multi-TRP PUCCH intra-slot PUCCH beam hopping scheme, and another one of the received PUCCH configurations contains PUCCH resources associated to multi-TRP inter-slot PUCCH repetition scheme and multi-TRP intra-slot PUCCH beam hopping scheme. The method of FIG. 7 may also include, at 710, receiving indications via DCI indicating one of the two (or more) PUCCH configurations and indicating a PUCCH resource. The method may then include, at 720, determining the multi-TRP PUCCH scheme based on one or more of the received indication that indicated the PUCCH configuration and the received indication that indicated the PUCCH resource, and/or the corresponding number of PUCCH repetitions.

It should be noted that, according to certain embodiments, the methods depicted in FIGS. 2-7 may be combined in any suitable manner and/or applied in parallel or simultaneously.

Figure 8A:
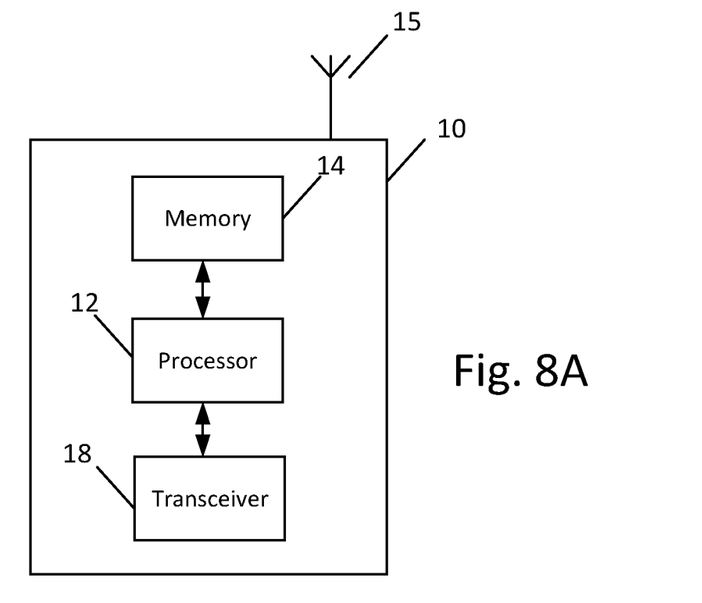
FIG. 8A illustrates an example block diagram of an apparatus, according to an embodiment.

FIG. 8A illustrates an example of an apparatus 10 according to an embodiment. In an embodiment, apparatus 10 may be a node, host, or server in a communications network or serving such a network. For example, apparatus 10 may be a network node, a sensing node, satellite, base station, a Node B, an evolved Node B (eNB), 5G Node B or access point, next generation Node B (NG-NB or gNB), TRP, HAPS, integrated access and backhaul (IAB) node, and/or a WLAN access point, associated with a radio access network, such as a LTE network, 5G or NR. In some example embodiments, apparatus 10 may be an eNB in LTE or gNB in 5G, for instance.

It should be understood that, in some example embodiments, apparatus 10 may be comprised of an edge cloud server as a distributed computing system where the server and the radio node may be stand-alone apparatuses communicating with each other via a radio path or via a wired connection, or they may be located in a same entity communicating via a wired connection. For instance, in certain example embodiments where apparatus 10 represents a gNB, it may be configured in a central unit (CU) and distributed unit (DU) architecture that divides the gNB functionality. In such an architecture, the CU may be a logical node that includes gNB functions such as transfer of user data, mobility control, radio access network sharing, positioning, and/or session management, etc. The CU may control the operation of DU(s) over a front-haul interface. The DU may be a logical node that includes a subset of the gNB functions, depending on the functional split option. It should be noted that one of ordinary skill in the art would understand that apparatus 10 may include components or features not shown in FIG. 8A.

As illustrated in the example of FIG. 8A, apparatus 10 may include a processor 12 for processing information and executing instructions or operations. Processor 12 may be any type of general or specific purpose processor. In fact, processor 12 may include one or more of general-purpose computers, special purpose computers, microprocessors, digital signal processors (DSPs), field-programmable gate arrays (FPGAs), application-specific integrated circuits (ASICs), and processors based on a multi-core processor architecture, or any other processing means, as examples. While a single processor 12 is shown in FIG. 8A, multiple processors may be utilized according to other embodiments. For example, it should be understood that, in certain embodiments, apparatus 10 may include two or more processors that may form a multiprocessor system (e.g., in this case processor 12 may represent a multiprocessor) that may support multiprocessing. In certain embodiments, the multiprocessor system may be tightly coupled or loosely coupled (e.g., to form a computer cluster).

Processor 12 may perform functions associated with the operation of apparatus 10, which may include, for example, precoding of antenna gain/phase parameters, encoding and decoding of individual bits forming a communication message, formatting of information, and overall control of the apparatus 10, including processes related to management of communication or communication resources.

Apparatus 10 may further include or be coupled to a memory 14 (internal or external), which may be coupled to processor 12, for storing information and instructions that may be executed by processor 12. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 14 can be comprised of any combination of random access memory (RAM), read only memory (ROM), static storage such as a magnetic or optical disk, hard disk drive (HDD), or any other type of non-transitory machine or computer readable media, or other appropriate storing means. The instructions stored in memory 14 may include program instructions or computer program code that, when executed by processor 12, enable the apparatus 10 to perform tasks as described herein.

In an embodiment, apparatus 10 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 12 and/or apparatus 10.

In some embodiments, apparatus 10 may also include or be coupled to one or more antennas 15 for transmitting and receiving signals and/or data to and from apparatus 10. Apparatus 10 may further include or be coupled to a transceiver 18 configured to transmit and receive information. The transceiver 18 may include, for example, a plurality of radio interfaces that may be coupled to the antenna(s) 15, or may include any other appropriate transceiving means. The radio interfaces may correspond to a plurality of radio access technologies including one or more of GSM, NB-IoT, LTE, 5G, WLAN, Bluetooth, BT-LE, NFC, radio frequency identifier (RFID), ultrawideband (UWB), MulteFire, and the like. The radio interface may include components, such as filters, converters (for example, digital-to-analog converters and the like), mappers, a Fast Fourier Transform (FFT) module, and the like, to generate symbols for a transmission via one or more downlinks and to receive symbols (via an uplink, for example).

As such, transceiver 18 may be configured to modulate information on to a carrier waveform for transmission by the antenna(s) 15 and demodulate information received via the antenna(s) 15 for further processing by other elements of apparatus 10. In other embodiments, transceiver 18 may be capable of transmitting and receiving signals or data directly. Additionally or alternatively, in some embodiments, apparatus 10 may include an input and/or output device (I/O device), or an input/output means.

In an embodiment, memory 14 may store software modules that provide functionality when executed by processor 12. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software.

According to some embodiments, processor 12 and memory 14 may be included in or may form a part of processing circuitry/means or control circuitry/means. In addition, in some embodiments, transceiver 18 may be included in or may form a part of transceiver circuitry/means.

As used herein, the term "circuitry" may refer to hardware-only circuitry implementations (e.g., analog and/or digital circuitry), combinations of hardware circuits and software, combinations of analog and/or digital hardware circuits with software/firmware, any portions of hardware processor(s) with software (including digital signal processors) that work together to cause an apparatus (e.g., apparatus 10) to perform various functions, and/or hardware circuit(s) and/or processor(s), or portions thereof, that use software for operation but where the software may not be present when it is not needed for operation. As a further example, as used herein, the term "circuitry" may also cover an implementation of merely a hardware circuit or processor (or multiple processors), or portion of a hardware circuit or processor, and its accompanying software and/or firmware. The term circuitry may also cover, for example, a baseband integrated circuit in a server, cellular network node or device, or other computing or network device.

As introduced above, in certain embodiments, apparatus 10 may be a network element or RAN node, such as a base station, access point, Node B, eNB, gNB, TRP, HAPS, IAB node, WLAN access point, or the like. In one example embodiment, apparatus 10 may be a gNB. According to certain embodiments, apparatus 10 may be controlled by memory 14 and processor 12 to perform the functions associated with any of the embodiments described herein. For example, in some embodiments, apparatus 10 may be configured to perform one or more of the processes depicted in any of the flow charts or signaling diagrams described herein, such as those illustrated in FIGS. 2-7, or any other method described herein. In some embodiments, as discussed herein, apparatus 10 may be configured to perform a procedure relating to enabling UEs to determine which multi-TRP PUCCH scheme should be used for a UCI transmission and appropriately switch between multi-TRP PUCCH schemes, as discussed elsewhere herein, for example.

For instance, in some embodiments, apparatus 10 may be controlled by memory 14 and processor 12 to transmit, to one or more UEs, an indication and/or configuration including information relating to or indicating one or more multi-TRP PUCCH schemes. The transmitted indication and/or configuration allows the UE(s) receiving the information to determine which multi-TRP PUCCH scheme should be used for a UCI transmission, as discussed elsewhere herein.

Figure 8B:
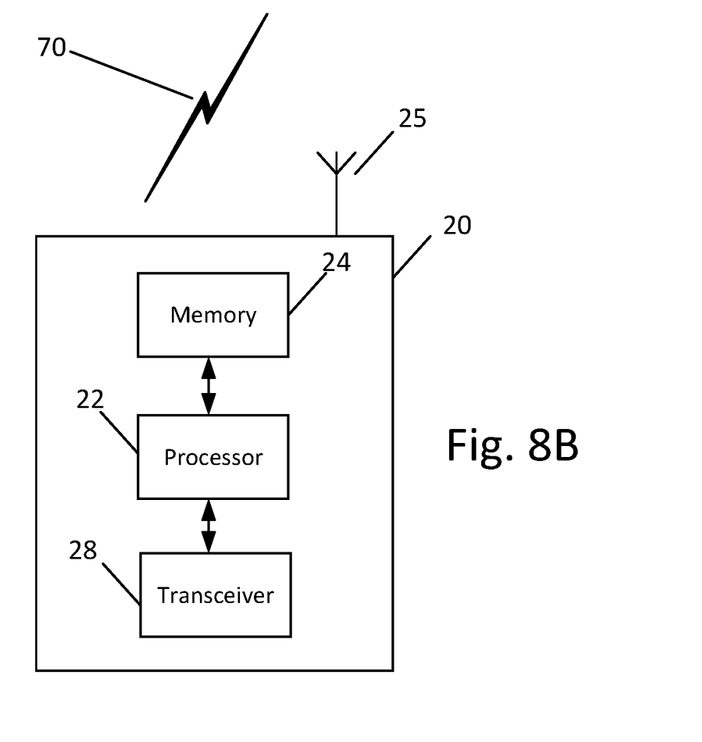
FIG. 8B illustrates an example block diagram of an apparatus, according to an embodiment.

FIG. 8B illustrates an example of an apparatus 20 according to another embodiment. In an embodiment, apparatus 20 may be a node or element in a communications network or associated with such a network, such as a UE, communication node, mobile equipment (ME), mobile station, mobile device, stationary device, IoT device, or other device. As described herein, a UE may alternatively be referred to as, for example, a mobile station, mobile equipment, mobile unit, mobile device, user device, subscriber station, wireless terminal, tablet, smart phone, IoT device, sensor or NB-IoT device, a watch or other wearable, a head-mounted display (HMD), a vehicle, a drone, a medical device and applications thereof (e.g., remote surgery), an industrial device and applications thereof (e.g., a robot and/or other wireless devices operating in an industrial and/or an automated processing chain context), a consumer electronics device, a device operating on commercial and/or industrial wireless networks, or the like. As one example, apparatus 20 may be implemented in, for instance, a wireless handheld device, a wireless plug-in accessory, or the like.

In some example embodiments, apparatus 20 may include one or more processors, one or more computer-readable storage medium (for example, memory, storage, or the like), one or more radio access components (for example, a modem, a transceiver, or the like), and/or a user interface. In some embodiments, apparatus 20 may be configured to operate using one or more radio access technologies, such as GSM, LTE, LTE-A, NR, 5G, WLAN, WiFi, NB-IoT, Bluetooth, NFC, MulteFire, and/or any other radio access technologies. It should be noted that one of ordinary skill in the art would understand that apparatus 20 may include components or features not shown in FIG. 8B.

As illustrated in the example of FIG. 8B, apparatus 20 may include or be coupled to a processor 22 for processing information and executing instructions or operations. Processor 22 may be any type of general or specific purpose processor. In fact, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 22 is shown in FIG. 8B, multiple processors may be utilized according to other embodiments. For example, it should be understood that, in certain embodiments, apparatus 20 may include two or more processors that may form a multiprocessor system (e.g., in this case processor 22 may represent a multiprocessor) that may support multiprocessing. In certain embodiments, the multiprocessor system may be tightly coupled or loosely coupled (e.g., to form a computer cluster).

Processor 22 may perform functions associated with the operation of apparatus 20 including, as some examples, precoding of antenna gain/phase parameters, encoding and decoding of individual bits forming a communication message, formatting of information, and overall control of the apparatus 20, including processes related to management of communication resources.

Apparatus 20 may further include or be coupled to a memory 24 (internal or external), which may be coupled to processor 22, for storing information and instructions that may be executed by processor 22. Memory 24 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 24 can be comprised of any combination of random access memory (RAM), read only memory (ROM), static storage such as a magnetic or optical disk, hard disk drive (HDD), or any other type of non-transitory machine or computer readable media. The instructions stored in memory 24 may include program instructions or computer program code that, when executed by processor 22, enable the apparatus 20 to perform tasks as described herein.

In an embodiment, apparatus 20 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 22 and/or apparatus 20.

In some embodiments, apparatus 20 may also include or be coupled to one or more antennas 25 for receiving a downlink signal and for transmitting via an uplink from apparatus 20. Apparatus 20 may further include a transceiver 28 configured to transmit and receive information. The transceiver 28 may also include a radio interface (e.g., a modem) coupled to the antenna 25. The radio interface may correspond to a plurality of radio access technologies including one or more of GSM, LTE, LTE-A, 5G, NR, WLAN, NB-IoT, Bluetooth, BT-LE, NFC, RFID, UWB, and the like. The radio interface may include other components, such as filters, converters (for example, digital-to-analog converters and the like), symbol demappers, signal shaping components, an Inverse Fast Fourier Transform (IFFT) module, and the like, to process symbols, such as OFDMA symbols, carried by a downlink or an uplink.

For instance, transceiver 28 may be configured to modulate information on to a carrier waveform for transmission by the antenna(s) 25 and demodulate information received via the antenna(s) 25 for further processing by other elements of apparatus 20. In other embodiments, transceiver 28 may be capable of transmitting and receiving signals or data directly. Additionally or alternatively, in some embodiments, apparatus 20 may include an input and/or output device (I/O device). In certain embodiments, apparatus 20 may further include a user interface, such as a graphical user interface or touchscreen.

In an embodiment, memory 24 stores software modules that provide functionality when executed by processor 22. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software. According to an example embodiment, apparatus 20 may optionally be configured to communicate with apparatus 10 via a wireless or wired communications link 70 according to any radio access technology, such as NR.

According to some embodiments, processor 22 and memory 24 may be included in or may form a part of processing circuitry or control circuitry. In addition, in some embodiments, transceiver 28 may be included in or may form a part of transceiving circuitry.

As discussed above, according to some embodiments, apparatus 20 may be a UE, SL UE, relay UE, mobile device, mobile station, ME, IoT device and/or NB-IoT device, or the like, for example. According to certain embodiments, apparatus 20 may be controlled by memory 24 and processor 22 to perform the functions associated with any of the embodiments described herein, such as one or more of the operations illustrated in, or described with respect to, FIGS. 1-7, or any other method described herein. For example, in an embodiment, apparatus 20 may be controlled to perform a process relating to determining which multi-TRP PUCCH scheme should be used for a UCI transmission and appropriately switching between multi-TRP PUCCH schemes, as described in detail elsewhere herein.

For instance, in certain embodiments, apparatus 20 may be controlled by memory 24 and processor 22 to receive an indication and/or configuration that includes information relating to or indicating one or more multi-TRP PUCCH schemes, to determine a multi-TRP scheme to apply for a UCI transmission using the indication and/or the configuration, and to transmit the UCI on PUCCH according to the determined multi-TRP PUCCH scheme. In an embodiment, the multi-TRP PUCCH schemes may include one or more of multi-TRP intra-slot PUCCH beam hopping, multi-TRP intra-slot PUCCH repetition, and/or multi-TRP inter-slot PUCCH repetition.

According to an embodiment, apparatus 20 may be controlled by memory 24 and processor 22 to receive, from a network node (e.g., gNB), configuration information indicating an association of a PUCCH resource to a multi-TRP scheme, and receive an indication to use the PUCCH resource for a multi-TRP PUCCH operation. Apparatus 20 may then be controlled by memory 24 and processor 22 to determine which of the one or more multi-TRP PUCCH schemes to apply based on the received configuration information and the indicated PUCCH resource.

In certain embodiments, apparatus 20 may be controlled by memory 24 and processor 22 to receive configuration information indicating an association of a PUCCH resource to a pair of multi-TRP PUCCH schemes, and to receive an indication to use the PUCCH resource for a multi-TRP PUCCH operation and/or receive an indication of the number of PUCCH repetitions. Apparatus 20 may then be controlled by memory 24 and processor 22 to determine which multi-TRP PUCCH scheme to apply based on the received configuration information, the indicated PUCCH resource, and the indicated number of PUCCH repetitions.

According to an embodiment, apparatus 20 may be controlled by memory 24 and processor 22 to, when the number of PUCCH repetitions is greater than one, and the PUCCH resource is associated to multi-TRP intra-slot PUCCH beam hopping scheme and multi-TRP intra-slot PUCCH repetition scheme, determine to apply the multi-TRP intra-slot PUCCH repetition scheme. Alternatively or additionally, when the number of PUCCH repetitions is equal to one, apparatus 20 may be controlled by memory 24 and processor 22 to determine to apply the multi-TRP intra-slot PUCCH beam hopping scheme.

In some embodiments, the pair of multi-TRP PUCCH schemes may include at least one of: multi-TRP intra-slot PUCCH beam hopping and/or multi-TRP intra-slot PUCCH repetition, and/or multi-TRP intra-slot PUCCH beam hopping and/or multi-TRP inter-slot PUCCH repetition.

According to certain embodiments, apparatus 20 may be controlled by memory 24 and processor 22 to receive configuration information indicating that a DCI format is configured with an indicator for multi-TRP PUCCH scheme pair, and receive DCI format containing an indication of the multi-TRP PUCCH scheme pair. Apparatus 20 may then be controlled by memory 24 and processor 22 to determine which of the one or more multi-TRP PUCCH schemes to apply based on at least one of the received indication or a configured or indicated number of PUCCH repetitions. In some embodiments, apparatus 20 may be controlled by memory 24 and processor 22 to, when the number of physical uplink control channel (PUCCH) repetitions is equal to one, determine to apply intra-slot beam hopping. Alternatively or additionally, when the number of PUCCH repetitions is greater than one, and the pair multi-TRP intra-slot PUCCH beam hopping scheme and multi-TRP intra-slot PUCCH repetition scheme is indicated, apparatus 20 may be controlled by memory 24 and processor 22 to determine to apply multi-TRP intra-slot PUCCH repetition.

In an embodiment, the multi-TRP PUCCH scheme pair may include one or more of: multi-TRP intra-slot PUCCH beam hopping and/or multi-TRP intra-slot PUCCH repetition, and/or at least one of multi-TRP intra-slot physical uplink control channel (PUCCH) beam hopping and/or multi-TRP inter-slot physical uplink control channel (PUCCH) repetition.

According to some embodiments, apparatus 20 may be controlled by memory 24 and processor 22 to receive configuration information indicating a default PUCCH scheme, to determine or receive an indication to use a multi-TRP PUCCH scheme, to determine that the indicated multi-TRP PUCCH scheme is not applicable or invalid, and to switch to using the default PUCCH scheme.

In certain embodiments, apparatus 20 may be controlled by memory 24 and processor 22 to receive at least two PUCCH configurations, to receive indications via DCI indicating one of the two PUCCH configurations and indicating a PUCCH resource, and to determine the multi-TRP PUCCH scheme based on at least one of the received indication that indicated at least one of the PUCCH configurations, the received indication that indicated the PUCCH resource, and/or a corresponding number of PUCCH repetitions.

According to an embodiment, at least one of the PUCCH configurations contains PUCCH resources associated to at least one of multi-TRP intra-slot PUCCH repetition scheme or multi-TRP intra-slot PUCCH beam hopping scheme, and the other at least one of the PUCCH configurations contains PUCCH resources associated to at least one of multi-TRP inter-slot PUCCH repetition scheme or multi-TRP intra-slot PUCCH beam hopping scheme.

In some embodiments, if the DCI does not include an indication of one of the at least two PUCCH configurations, apparatus 20 may be controlled by memory 24 and processor 22 to use a default PUCCH configuration.

According to certain embodiments, apparatus 20 may be controlled by memory 24 and processor 22 to, when two PUCCH configurations are configured and/or received, and both are within the same PHY priority, interpret the PHY indicator as the multi-TRP PUCCH scheme indication. In an embodiment, when two PUCCH configurations are configured and/or received and have different PHY priority, apparatus 20 may be controlled by memory 24 and processor 22 to apply legacy behavior for interpreting the PHY priority indicator. In an embodiment, when three PUCCH configurations are configured and/or received and have different PHY priority: for two PUCCH configurations with high priority, apparatus 20 may be controlled by memory 24 and processor 22 to select which configuration to use considering high-priority configurations; for two PUCCH configurations with low priority, apparatus 20 may be controlled by memory 24 and processor 22 to select one of (i) the high-priority configuration or (ii) one low-priority configuration, where within the low priority configurations using a pre-defined default configuration; for two PUCCH configurations with high priority, apparatus 20 may be controlled by memory 24 and processor 22 to select one of (i) the low-priority configuration and (ii) one high-priority configuration, where within the high-priority configurations using a pre-defined default configuration. In an embodiment, when four PUCCH configurations are configured and/or received and have different PHY priority, apparatus 20 may be controlled by memory 24 and processor 22 to select which of the configurations to use considering high-priority configurations, or to select high-priority configurations or low priority configurations.

In some embodiments, an apparatus (e.g., apparatus 10 and/or apparatus 20) may include means for performing a method, a process, or any of the variants discussed herein. Examples of the means may include one or more processors, memory, controllers, transmitters, receivers, and/or computer program code for causing the performance of the operations.

In view of the foregoing, certain example embodiments provide several technological improvements, enhancements, and/or advantages over existing technological processes and constitute an improvement at least to the technological field of wireless network control and management. For example, as discussed in detail above, certain embodiments enable a UE to dynamically determine which multi-TRP PUCCH scheme to apply. Such dynamic switching, and related DCI field interpretation, is important especially for a UE that has different types of services especially in terms of latency and, thus, where various multi-TRP PUCCH schemes would need to be used for this UE. In addition, certain embodiments allow the UE to determine a default PUCCH scheme in case the indicated multi-TRP scheme is not valid. Accordingly, the use of certain example embodiments results in improved functioning of communications networks and their nodes, such as base stations, eNBs, gNBs, and/or IoT devices, UEs or mobile stations.

In some example embodiments, the functionality of any of the methods, processes, signaling diagrams, algorithms or flow charts described herein may be implemented by software and/or computer program code or portions of code stored in memory or other computer readable or tangible media, and may be executed by a processor.

In some example embodiments, an apparatus may include or be associated with at least one software application, module, unit or entity configured as arithmetic operation(s), or as a program or portions of programs (including an added or updated software routine), which may be executed by at least one operation processor or controller. Programs, also called program products or computer programs, including software routines, applets and macros, may be stored in any apparatus-readable data storage medium and may include program instructions to perform particular tasks. A computer program product may include one or more computer-executable components which, when the program is run, are configured to carry out some example embodiments. The one or more computer-executable components may be at least one software code or portions of code. Modifications and configurations required for implementing the functionality of an example embodiment may be performed as routine(s), which may be implemented as added or updated software routine(s). In one example, software routine(s) may be downloaded into the apparatus.

As an example, software or computer program code or portions of code may be in source code form, object code form, or in some intermediate form, and may be stored in some sort of carrier, distribution medium, or computer readable medium, which may be any entity or device capable of carrying the program. Such carriers may include a record medium, computer memory, read-only memory, photoelectrical and/or electrical carrier signal, telecommunications signal, and/or software distribution package, for example. Depending on the processing power needed, the computer program may be executed in a single electronic digital computer or it may be distributed amongst a number of computers. The computer readable medium or computer readable storage medium may be a non-transitory medium.

In other example embodiments, the functionality of example embodiments may be performed by hardware or circuitry included in an apparatus, for example through the use of an application specific integrated circuit (ASIC), a programmable gate array (PGA), a field programmable gate array (FPGA), or any other combination of hardware and software. In yet another example embodiment, the functionality of example embodiments may be implemented as a signal, such as a non-tangible means, that can be carried by an electromagnetic signal downloaded from the Internet or other network.

According to an example embodiment, an apparatus, such as a node, device, or a corresponding component, may be configured as circuitry, a computer or a microprocessor, such as single-chip computer element, or as a chipset, which may include at least a memory for providing storage capacity used for arithmetic operation(s) and/or an operation processor for executing the arithmetic operation(s).

Example embodiments described herein may apply to both singular and plural implementations, regardless of whether singular or plural language is used in connection with describing certain embodiments. For example, an embodiment that describes operations of a single network node may also apply to embodiments that include multiple instances of the network node, and vice versa.

One having ordinary skill in the art will readily understand that the example embodiments as discussed above may be practiced with procedures in a different order, and/or with hardware elements in configurations which are different than those which are disclosed. Therefore, although some embodiments have been described based upon these example embodiments, it would be apparent to those of skill in the art that certain modifications, variations, and alternative constructions would be apparent, while remaining within the spirit and scope of example embodiments.

PARTIAL GLOSSARY

5G—5$^{th}$ Generation
gNB—5G/NR base station
NR—New Radio
RAN—Radio Access Network
UE—User Equipment
TRP—Transmission Reception Point
UL—Uplink
DL—Downlink
DCI—Downlink Control Information
MAC CE—Medium Access Control Control Element
PUCCH—Physical Uplink Control Channel
PUSCH—Physical Uplink Shared Channel
PDCCH—Physical Downlink Control Channel
PDSCH—Physical Downlink Shared Channel
PRI—PUCCH Resource Index
TCI—Transmission Configuration Indicator
TDM—Time Division Multiplexing
UCI—Uplink Control Information
FR 1—Frequency Range 1
SR—Scheduling Request
SPS—Semi-Persistent Scheduling
CSI—Channel State Information
HARQ—Hybrid Automatic Repeat request
HARQ-ACK—HARQ Acknowledgment
CCE—Control Channel Element
CORESET—Control Resource Set
TB—Transport Block
CG—Configured grant
PID—process ID
LCH—Logical Channel
SRS—Sounding Reference Signal
SRI—SRS resource indicator.
SSB—Synchronization Signal Block
PBCH—Physical Broadcast Channel
TDD—Time Division Duplexing
RS—Reference Signal

We claim:

1. A method, comprising:
receiving, at a user equipment from a network node, (i) at least one of an indication or configuration comprising information indicating an association of a physical uplink control channel (PUCCH) resource to a multiple transmission reception point (multi-TRP) scheme, which relates to one or more multi-TRP PUCCH schemes, and (ii) an indication to use the PUCCH resource for a multi-TRP PUCCH operation;
determining one of the one or more multi-TRP PUCCH schemes to apply for an uplink control information (UCI) transmission based on the at least one of the indication or the configuration and based on the indicated PUCCH resource; and
transmitting the UCI on a PUCCH according to the determined multi-TRP PUCCH scheme.

2. The method of claim 1, wherein:
when the PUCCH resource includes at least one of a plurality of spatial settings or a plurality of power control parameters, the multi-TRP PUCCH scheme to be applied is determined using the at least one of the plurality of spatial settings or the plurality of power control parameters for repetitions of the transmitting of the UCI.

3. The method of claim 1, wherein:
the receiving comprises receiving configuration information indicating association of PUCCH resource to a pair of multi-TRP PUCCH schemes, and receiving an indication of a number of PUCCH repetitions; and
the determining comprises determining which multi-TRP PUCCH scheme to apply based on the received configuration information, the indicated PUCCH resource, and the indicated number of PUCCH repetitions.

4. The method of claim 1,
wherein the receiving comprises receiving configuration information indicating a default PUCCH scheme,
wherein the determining comprises determining or receiving an indication to use a multi-TRP PUCCH scheme, and
the method further comprises:
determining that the indicated multi-TRP PUCCH scheme is not applicable or invalid; and
switching to using the default PUCCH scheme.

5. The method of claim 1, wherein:
the receiving comprises receiving at least two PUCCH configurations, and receiving indications via downlink control information (DCI) indicating one of the at least two PUCCH configurations and indicating the PUCCH resource; and
the determining comprises determining the multi-TRP PUCCH scheme based on at least one of the received indication that indicated at least one of the PUCCH configuration, the received indication that indicated the PUCCH resource, or a corresponding number of PUCCH repetitions.

6. An apparatus, comprising:
at least one processor; and
at least one memory comprising computer program code, the at least one memory and computer program code being configured, with the at least one processor, to cause the apparatus at least to:
receive (i) least one of an indication or configuration comprising information indicating an association of a physical uplink control channel (PUCCH) resource to a multiple transmission reception point (multi-TRP) scheme, which relates to one or more multi-TRP PUCCH schemes, and (ii) an indication to use the PUCCH resource for a multi-TRP PUCCH operation;
determine one of the one or more multi-TRP PUCCH schemes to apply for an uplink control information (UCI) transmission based on at least one of the indication or the configuration and based on the indicated PUCCH resource; and
transmit the UCI on a PUCCH according to the determined multi-TRP PUCCH scheme.

7. The apparatus of claim 6, wherein the multi-TRP PUCCH schemes comprise at least one of multi-TRP intra-slot PUCCH beam hopping, multi-TRP intra-slot PUCCH repetition, or multi-TRP inter-slot PUCCH repetition.

8. The apparatus of claim 6, wherein:
when the PUCCH resource includes at least one of a plurality of spatial settings or a plurality of power control parameters, the multi-TRP PUCCH scheme to be applied is determined using the at least one of the plurality of spatial settings or the plurality of power control parameters for repetitions of the transmitting of the UCI.

9. The apparatus of claim 6, wherein:
the receiving comprises receiving configuration information indicating association of the PUCCH resource to a pair of multi-TRP PUCCH schemes, and receiving an indication of a number of PUCCH repetitions; and
the determining of the multi-TRP PUCCH scheme to apply is based on the received configuration information, the indicated PUCCH resource, and the indication of the number of PUCCH repetitions.

10. The apparatus of claim 9, wherein the determining comprises:
when the number of PUCCH repetitions is greater than one, and the PUCCH resource is associated to multi-TRP intra-slot physical uplink control channel (PUCCH) PUCCH beam hopping scheme and multi-TRP intra-slot PUCCH repetition scheme, determining to apply the multi-TRP intra-slot PUCCH repetition scheme; or
when the number of PUCCH repetitions is equal to one, determining to apply the multi-TRP intra-slot PUCCH beam hopping scheme.

11. The apparatus of claim 9, wherein the pair of multi-TRP PUCCH schemes comprises at least one of:
at least one of multi-TRP intra-slot PUCCH beam hopping or multi-TRP intra-slot PUCCH repetition; or
at least one of multi-TRP intra-slot PUCCH beam hopping or multi-TRP inter-slot PUCCH repetition.

12. The apparatus of claim 6, wherein:
the receiving comprises receiving configuration information indicating that a downlink control information (DCI) format is configured with an indicator for multi-TRP PUCCH scheme pair, and receiving DCI format containing an indication of the multi-TRP PUCCH scheme pair; and
the determining comprises determining which of the one or more multi-TRP PUCCH schemes to apply based on at least one of the received indication or a configured or indicated number of PUCCH repetitions.

13. The apparatus of claim 12, wherein the determining comprises:
when the number of PUCCH repetitions is equal to one, determining to apply intra-slot beam hopping; or
when the number of PUCCH repetitions is greater than one, and the pair multi-TRP intra-slot PUCCH beam hopping scheme and multi-TRP intra-slot PUCCH repetition scheme is indicated, determining to apply multi-TRP intra-slot PUCCH repetition.

14. The apparatus of claim 12, wherein the multi-TRP PUCCH scheme pair comprises at least one of:
 at least one of multi-TRP intra-slot PUCCH beam hopping or multi-TRP intra-slot PUCCH repetition; or
 at least one of multi-TRP intra-slot PUCCH beam hopping or multi-TRP inter-slot PUCCH repetition.

15. The apparatus of claim 6, wherein:
 the receiving comprises receiving configuration information indicating a default PUCCH scheme; and
 the determining comprises:
  determining or receiving an indication to use a multi-TRP PUCCH scheme;
  determining that the indicated multi-TRP PUCCH scheme is not applicable or invalid; and
  switching to using the default PUCCH scheme.

16. The apparatus of claim 6, wherein:
 the receiving comprises receiving at least two PUCCH configurations;
 the receiving comprises receiving indications via downlink control information (DCI) indicating one of the at least two PUCCH configurations; and
 the determining comprises determining the multi-TRP PUCCH scheme based on at least one of the received indication that indicated at least one of the PUCCH configuration, the received indication that indicated the PUCCH resource, or a corresponding number of PUCCH repetitions.

17. The apparatus of claim 16, wherein at least one of the PUCCH configurations contains PUCCH resources associated to at least one of multi-TRP intra-slot PUCCH repetition scheme or multi-TRP intra-slot PUCCH beam hopping scheme, and the other at least one of the PUCCH configurations contains PUCCH resources associated to at least one of multi-TRP inter-slot PUCCH repetition scheme or multi-TRP intra-slot PUCCH beam hopping scheme.

18. The apparatus of claim 16, wherein, when the DCI does not include an indication of one of the at least two PUCCH configurations, the at least one memory and computer program code are further configured, with the at least one processor, to cause the apparatus at least to use a default PUCCH configuration.

19. The apparatus of claim 16, wherein the at least one memory and computer program code are further configured, with the at least one processor, to cause the apparatus at least to:
 when two PUCCH configurations are received, and both PUCCH configurations are within a same physical layer (PHY) priority, interpret a physical layer (PHY) priority indicator as a multi-TRP PUCCH scheme indication;
 when two PUCCH configurations are received and have different physical layer (PHY) priority, apply legacy behavior for interpreting the PHY priority indicator;
 when three PUCCH configurations are received and have different PHY priority,
  for two PUCCH configurations with high priority, select which configuration to use considering high-priority configurations,
  for two PUCCH configurations with low priority, select one of (i) the high-priority configuration or (ii) one low-priority configuration, wherein within the low-priority configurations the apparatus uses a pre-defined default configuration,
  for two PUCCH configurations with high priority, select one of (i) the low-priority configuration and (ii) one high-priority configuration, wherein within the high-priority configurations the apparatus uses a pre-defined default configuration;
 when four PUCCH configurations are received and have different PHY priority, select which of the configurations to use considering high-priority configurations, or select high-priority configurations or low priority configurations.

20. A non-transitory computer readable medium comprising program instructions stored thereon for performing at least the following:
 receiving (i) at least one of an indication or configuration comprising information indicating an association of a physical uplink control channel (PUCCH) resource to a multiple transmission reception point (multi-TRP) scheme, which relates to one or more multi-TRP PUCCH schemes, and (ii) an indication to use the PUCCH resource for a multi-TRP PUCCH operation;
 determining one or the one or more multi-TRP PUCCH schemes to apply for an uplink control information (UCI) transmission based on at least one of the indication or the configuration and based on the indicated PUCCH resource; and
 transmitting the UCI on a PUCCH according to the determined multi-TRP PUCCH scheme.

* * * * *